United States Patent
Beller et al.

(10) Patent No.: US 10,872,205 B2
(45) Date of Patent: Dec. 22, 2020

(54) PROCESS FOR IDENTIFYING COMPLETION OF DOMAIN ADAPTATION DICTIONARY ACTIVITIES

(71) Applicant: INTERNATIONAL BUSINESS MACHINES CORPORATION, Armonk, NY (US)

(72) Inventors: Charles E. Beller, Baltimore, MD (US); Paul J. Chase, Fairfax, VA (US); Richard Darden, Leesburg, VA (US); Michael Drzewucki, Woodbridge, VA (US); Edward G. Katz, Washington, DC (US); Christopher Phipps, Arlington, VA (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 16/376,338

(22) Filed: Apr. 5, 2019

(65) Prior Publication Data

US 2019/0228067 A1 Jul. 25, 2019

Related U.S. Application Data

(62) Division of application No. 15/400,300, filed on Jan. 6, 2017, now Pat. No. 10,303,763.

(51) Int. Cl.
  *G06F 17/20* (2006.01)
  *G06F 40/284* (2020.01)
  (Continued)

(52) U.S. Cl.
  CPC ........ *G06F 40/284* (2020.01); *G06F 16/3329* (2019.01); *G06F 16/3344* (2019.01);
  (Continued)

(58) Field of Classification Search
  CPC .. G06F 16/3329; G06F 40/30; G06F 16/3331; G06F 16/00; G06F 16/36;
  (Continued)

(56) References Cited

U.S. PATENT DOCUMENTS

| 6,188,976 B1* | 2/2001 | Ramaswamy ........ G10L 15/183 704/1 |
| 2015/0026106 A1* | 1/2015 | Oh ...................... G06F 16/3347 706/12 |

(Continued)

FOREIGN PATENT DOCUMENTS

WO 2011051970 A2 5/2011

OTHER PUBLICATIONS

IBM; "Method and System of Automatically Constructing Domain-oriented Dynamic Polarity Dictionary for Sentiment Analysis"; http://ip.com/IPCOM/000188595D; Oct. 15, 2009.

(Continued)

*Primary Examiner* — Huyen X Vo
(74) *Attorney, Agent, or Firm* — Conley Rose, P.C.

(57) ABSTRACT

An apparatus comprising a memory and a processor configured for semi-autonomous natural language processing domain adaptation related activities. The processor coupled to the memory and configured to identify a corpus of documents of an evaluation domain and generate a first lexicon based on the corpus of documents of the evaluation domain, and determine a threshold that indicates a sufficiency of domain adaptation of the evaluation domain based at least in part on the first lexicon. The processor is further configured to identify a corpus of documents of a client domain, generate a second lexicon based on the corpus of documents of the client domain, determine a metric associated with the corpus of documents of the client domain and the second lexicon, and determine that domain adaptation of (Continued)

the client domain is complete when the metric exceeds the threshold.

20 Claims, 6 Drawing Sheets

(51) Int. Cl.
  *G06F 16/93* (2019.01)
  *G06F 16/332* (2019.01)
  *G06F 16/33* (2019.01)
  *G06F 40/30* (2020.01)
  *G06F 40/242* (2020.01)

(52) U.S. Cl.
  CPC ............ *G06F 16/93* (2019.01); *G06F 40/242* (2020.01); *G06F 40/30* (2020.01)

(58) Field of Classification Search
  CPC ............. G06F 16/9535; G06F 16/3344; G06F 16/243; G06F 16/90332; G06F 16/334; G06F 16/2455; G06F 16/285; G06F 16/337; G06F 16/35; G06F 16/353; G06F 16/367; G06F 16/93; G06F 40/20; G06F 16/86; G06F 16/958; G06F 16/2379; G06F 40/10; G10L 15/22; G10L 15/26; G10L 25/63; G10L 15/1822; G10L 15/265
  See application file for complete search history.

(56) References Cited

U.S. PATENT DOCUMENTS

| | | |
|---|---|---|
| 2015/0066479 A1 | 3/2015 | Pasupalak et al. |
| 2015/0169544 A1 | 6/2015 | Bufe, III et al. |
| 2016/0005325 A1 | 1/2016 | Bagchi et al. |
| 2016/0092453 A1 | 3/2016 | Oberhofer et al. |
| 2016/0189037 A1 | 6/2016 | Pereg et al. |
| 2017/0192955 A1 | 6/2017 | Zeichner et al. |

OTHER PUBLICATIONS

Anonymously; "A system and method to improve sentiment analysis using socially-contributed dictionaries"; http://ip.com/IPCOM/000246829D; Jul. 5, 2016.

Daume, III, et al., "Domain Adaptation for Statistical Classifiers," Journal of Artificial Intelligence Research, vol. 26, 2006, pp. 101-126.

Hoover, "Another Perspective on Vocabulary Richness," Computers and the Humanitites, vol. 37, Issue 2, 2003, pp. 151-178.

Tweedie, et al., "How Variable May a Constant be? Measures of Lexical Richness in Perspective," Computers and the Humanitites, vol. 32, pp. 323-252, 1998.

Savoy, et al., "Vocabulary Growth Study: An Example with the State of the Union Addresses*," Journal of Quantitative Linguistics, vol. 22, No. 4, http://dx.doi.org/10.1080/09296174.2015.1106270, 2015, pp. 289-310.

Park, et al., "Automatic Glossary Extraction: Beyond Terminology Identification," International Conference on Computational Linguistics, Proceedings of the 19th International Conference on Computational Linguistics, Taipei, Taiwan, 2002, 7 pages.

Office Action dated Jun. 11, 2018, U.S. Appl. No. 15/400,300, filed Jan. 6, 2017, 6 pages.

Office Action dated Oct. 16, 2018, U.S. Appl. No. 15/400,300, filed Jan. 6, 2017, 14 pages.

Notice of Allowance dated Jan. 9, 2019, U.S. Appl. No. 15/400,300, filed Jan. 6, 2017, 8 pages.

List of IBM Patents or Patent Applications Treated as Related, Apr. 5, 2019, 2 pages.

\* cited by examiner

PROCESS FOR IDENTIFYING COMPLETION OF DOMAIN ADAPTATION DICTIONARY ACTIVITIES

STATEMENT REGARDING FEDERALLY SPONSORED RESEARCH OR DEVELOPMENT

This invention was made with United States Government support under Agreement No. 2013-12101100008. The GOVERNMENT HAS CERTAIN RIGHTS IN THE INVENTION.

BACKGROUND

The present disclosure relates to the field of natural language processing, and more specifically to domain adaptation for deep question answering.

Natural language processing enables electronic systems to interpret input in a natural language form (e.g., as would be naturally spoken or written by a human) in a manner that may be at least partially similar to a manner in which a human might interpret the content of the input. To perform such processing, the electronic systems may develop an understanding of certain key terms or phrases that may be relevant to natural language processing in a certain field or subject area. A process of developing this understanding may be referred to as domain adaptation, and depending on a richness of a vocabulary of a domain for which natural language processing is desired, may involve significant time, cost, and/or user input. Furthermore, because the domain may be regularly changing and may include a large number of terms, all of which may not be beneficial to natural language processing, it may be desirable to provide for embodiments that determine a sufficiency of domain adaptation of a domain.

SUMMARY

According to an embodiment of the present invention, an apparatus comprising a memory and a processor coupled to the memory. The processor is configured to identify a corpus of documents of an evaluation domain. The processor is further configured to generate a first lexicon based on the corpus of documents of the evaluation domain. The processor is further configured to determine a threshold that indicates a sufficiency of domain adaptation of the evaluation domain based at least in part on the first lexicon. The processor is further configured to identify a corpus of documents of a client domain. The processor is further configured to generate a second lexicon based on the corpus of documents of the client domain. The processor is further configured to determine a metric associated with the corpus of documents of the client domain and the second lexicon. The processor is further configured to determine that domain adaptation of the client domain is complete when the metric exceeds the threshold.

According to an embodiment of the present invention, a computer-implemented method comprising identifying, by a processor, a corpus of documents from within a domain. The computer-implemented method also includes determining, by the processor, an evaluation question for use with a question answering system to determine an answer to the evaluation question based on content of the domain. The computer-implemented method also includes partitioning the corpus of documents into a plurality of sub-corpora, generating a lexicon for each of the respective sub-corpora, generating a plurality of test systems each corresponding uniquely to one of the plurality of sub-corpora. The computer-implemented method also includes evaluating the evaluation question using the plurality of test systems to determine a plurality of evaluation results each corresponding uniquely to one of the plurality of test systems. The computer-implemented method also includes determining a threshold for sufficiency of domain adaptation based on at least one of the evaluation results.

According to an embodiment of the present invention, a computer program product for performing domain adaptation of a domain, the computer program product comprising a computer readable storage medium having program instructions embodied therewith, the program instructions executable by a processor to cause the processor to identify a corpus of documents from within a client domain. The program instructions further cause the processor to divide the corpus of documents into a plurality of sub-corpora. The program instructions further cause the processor to extract at least one domain term from each of the plurality of sub-corpora. The domain terms extracted from one of the plurality of sub-corpora may form a lexicon for that respective sub-corpora of the plurality of sub-corpora. The program instructions further cause the processor to determine a metric having a relationship to the lexicon for that respective sub-corpora of the plurality of sub-corpora. The program instructions further cause the processor to determine, based at least in part on the metric, that sufficient domain adaptation of the client domain has been performed.

DETAILED DESCRIPTION

Disclosed herein are various embodiments that provide for semi-autonomous natural language processing domain adaptation for domains having a dynamically changing corpus of documents. The disclosed embodiments may provide for determining a sufficiency of the domain adaptation based on, for example, a ratio of a number of new terms derived from the corpus to a total number of terms derived from the corpus exceeding a threshold level. In some embodiments, a threshold level for indicating sufficiency of a dictionary of terms derived from domain adaptation may be determined by performing domain adaptation of a sample domain of documents that spans one or more subject matter areas and performing question answering with the dictionary generated by the domain adaptation of the sample domain to determine when a sufficiently robust dictionary exists such that adding additional terms to the dictionary does not increase an ability to perform question answering.

Figure 1:
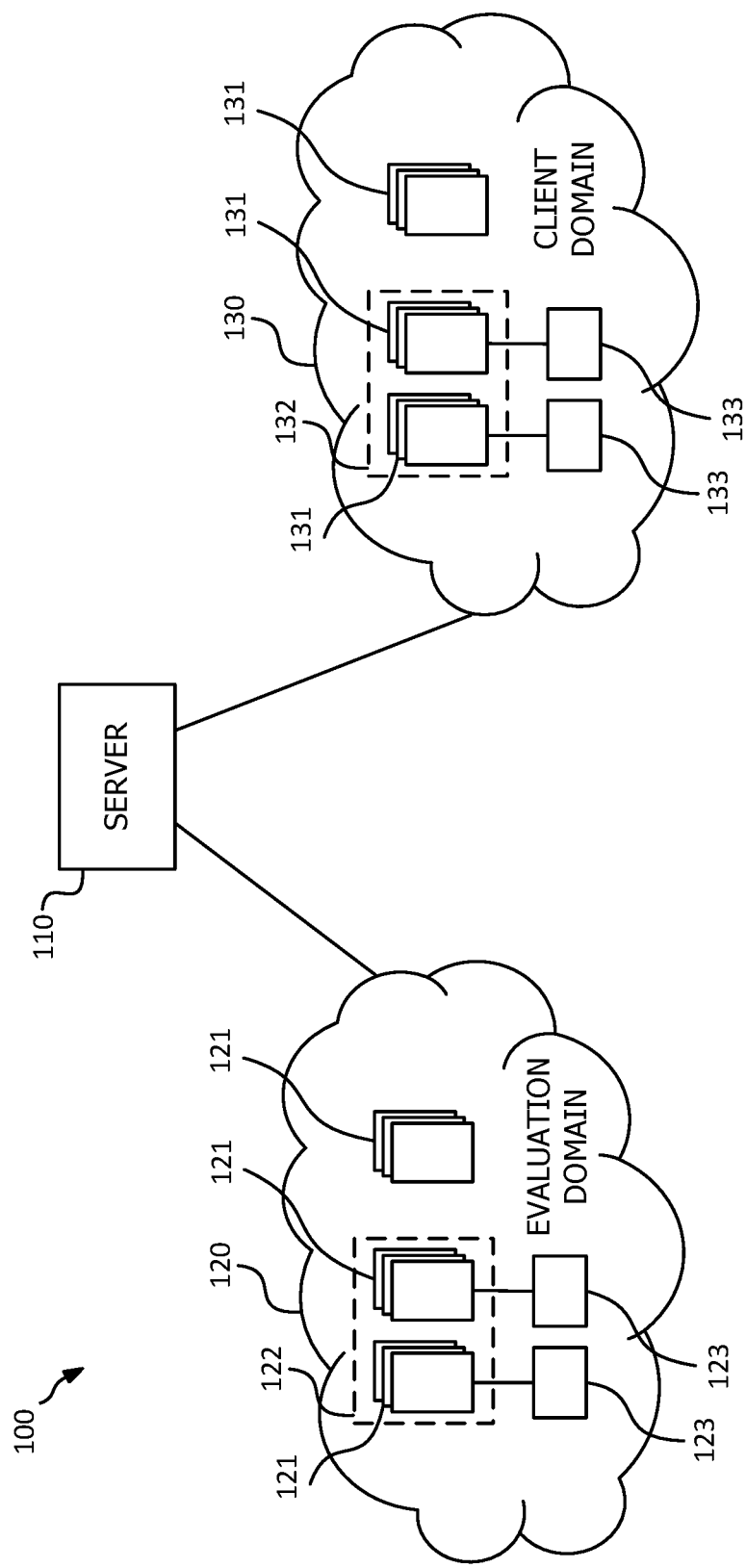
FIG. 1 depicts a block diagram of a system for domain adaptation according to various embodiments.

With reference now to FIG. 1, a block diagram of a system 100 for domain adaptation according to various embodiments is shown. In some embodiments, the system 100 may be configured to perform domain adaptation to generate a lexicon (e.g., a dictionary for natural language processing and/or deep question answering) of domain terms based on a corpus of documents selected from the domain for which the system 100 is performing domain adaptation. The domain, and in some embodiments the corpus, may dynamically change such that existing documents may be removed from the domain and/or corpus, or new documents may be added to the domain and/or corpus, with a high degree of frequency (e.g., substantially continuously).

The system 100 may include a server 110 that may be configured to interact (e.g., via a network) with one or more domains to perform domain adaptation. For example, the server 110 may interact (e.g., via a network such as a local area network (LAN) or a wide area network (WAN), such as via the Internet), with an evaluation domain 120 and/or a client domain 130. The server 110 may, in some embodiments, be configured to operate at least partially in a cloud computing environment and as such, may sometimes be considered a cloud computing node. The evaluation domain 120 may be a blind evaluation domain comprising documents 121 that may cross a plurality of subject matter areas. The server 110 may identify a corpus 122 of documents 121 that includes less than all documents 121 contained in the evaluation domain 120. The evaluation domain 120 may further include one or more questions (e.g., questions associated with a question answering system) for which answers may be derived or determined from content of the one or more documents and/or for which a set of answers may be known. For example, the evaluation domain 120 may be configured such that the server 110 may perform domain adaptation to generate a dictionary or lexicon 123 of terms contained in the documents 121 of the evaluation domain 120 and having a relationship to the evaluation domain 120. Alternatively, the server 110 may determine the one or more questions based on input from a user, contents of the documents 121, or any other suitable means. Utilizing the one or more questions, the server 110 may determine a sufficiency of the dictionary or lexicon 123. For example, the server 110 may use the dictionary or lexicon 123 generated based on contents of documents 121 in the evaluation domain 120 to determine an answer to at least one of the one or more questions. The answer determined by the server 110 may, in some embodiments, be evaluated manually to determine whether the answer is sufficient. In other embodiments, the answer determined by the server 110 may be compared to a known or expected answer to determine whether the answer is sufficient. When the server 110 determines that the generated dictionary or lexicon 123 corresponding to the evaluation domain 120 is sufficient to answer all of the one or more questions, or a predetermined percentage or quantity of the one or more questions, the server 110 may determine that a percentage of the evaluation domain 120 on which domain adaptation has been performed is sufficient. As such, the server 110 may determine the percentage of the evaluation domain 120 on which domain adaptation has been performed as a threshold value for determining sufficiency of domain adaptation of other domains, such as, in some embodiments, the client domain 130. The percentage may indicate, for example, a percentage of all possible terms related to documents 121 within the evaluation domain 120 that are included in the dictionary or lexicon 123 of terms as a result of domain adaptation. For example, the server 110 may determine, in some embodiments, that a percentage of the evaluation domain 120 for which domain adaptation has been completed (e.g., a percentage of all possible terms of documents 121 within the evaluation domain 120 that are included in the dictionary or lexicon 123) is sufficient when 80 percent (%) of the terms in the evaluation domain 120 are included in the dictionary or lexicon 123. In other embodiments, other percentages may be determined as a threshold for sufficiency of domain adaptation based on, for example, a complexity and/or similarity of the terms of the evaluation domain 120, a complexity of the questions for which answers will be determined using the terms of the evaluation domain 120, and/or other suitable criteria that may characterize one domain as being different from another domain. In yet other embodiments, the threshold may be determined based, at least in part, on a ratio of newly extracted terms (e.g., terms not previously seen by the server 110) to previously extracted terms (e.g., terms previously seen by the server 110 and extracted for inclusion in the dictionary or lexicon 123).

The client domain 130 may be a domain of documents 131 that may have a relationship to operations of the client for which the system 100 is performing domain adaptation for natural language processing and/or deep question answering. In some embodiments the server 110 performs domain adaptation based on documents 131 of the client domain 130 (e.g., to generate a dictionary or lexicon 133 of terms having a relationship to the client domain 130) to adapt the server 110 to perform natural language processing and/or deep question answering in response to inputs received by the server 110 and having a relationship to at least some contents of one or more documents 131 of the client domain 130.

In some embodiments, the client domain 130 may be a dynamically changing domain. For example, the client domain 130 may change periodically, aperiodically, substantially continuously, or with any other time frame or periodicity based on activities of the client associated with the client domain 130. For example, the client domain 130 may change when a document 131 in the client domain 130 is modified (e.g., terms are added to and/or removed from the document 131), when a new document 131 is added to the client domain 130, and/or when a document 131 is removed from the client domain 130. Such dynamic changing of the client domain 130 may cause a number or quantity of terms available for inclusion in a dictionary or lexicon 133 of terms having a relationship to the client domain 130 to dynamically change. For example, the number of terms available for inclusion in the dictionary or lexicon 133 of terms having the relationship to the client domain 130 may change while the server 110 is performing domain adaptation such that a term included in the dictionary or lexicon 133 by the server 110 that may be present in the client domain 130 at a beginning of the domain adaptation may no longer be present in the client domain 130 when the server 110 concludes the domain adaptation. Similarly, a term that may or may not be included in the dictionary or lexicon 133 may not be present in the client domain 130 when the server 110 begins the domain adaptation but may be added to the client domain 130 during the domain adaptation (and may or may not be present in the client domain 130 when the server 110 concludes the domain adaptation).

The server 110 may generate the dictionary or lexicon 133 by identifying a corpus 132 of documents within the client domain 130 and dividing the corpus 132 into a plurality of sub-corpora. From each of the sub-corpora, the server 110 may extract domain terms to form the dictionary or lexicon 133. Domain terms may be extracted from each of the sub-corpora by any suitable means including, but not limited to, n-gram frequency lists generated automatically (e.g., by the server 110), n-grams manually determined via user input, various forms of semi-automatic methods (e.g., methods in which some user or manual interaction may occur), key-phrase extraction, and/or any other suitable form of extracting domain terms from a corpus or sub-corpora of documents. As used above, a n-gram may be a group of items extracted from the corpus or sub-corpora such as, for example, single words, word pairs (e.g., two-word pairs, three-word pairs, etc.), syllables of all or part of one or more words, letters of all or part of one or more words, etc. The server 110 may determine whether the dictionary or lexicon 133 contains a sufficient number of domain terms to be considered complete such that domain adaptation of the client domain 130 may end based, at least in part, on a metric related to the number of domain terms in the dictionary or lexicon 133. The server 110 may further determine whether the dictionary or lexicon 133 contains a sufficient number of domain terms to be considered complete based on a threshold determined, for example, based on the evaluation domain 120. For example, the server 110 may further determine whether the dictionary or lexicon 133 contains a sufficient number of domain terms based on a comparison of the metric to the threshold, where the server 110 determines that domain adaptation is complete when the metric is less than the threshold. The metric, in some embodiments, may indicate a ratio of new domain terms extracted from the corpus 132 or sub-corpora for a first time to domain terms that have already been extracted from the corpus 132 or sub-corpora (e.g., already seen by the server 110 during the domain adaptation of the client domain 130).

Optionally, in some embodiments the server 110 is further configured to perform question answering according to natural language processing. For example, before performing the domain adaptation activities described above (e.g., before the server 110 identifies the corpus 122 of documents 121), the server 110 may be configured to receive a first question for processing according to natural language processing and perform first natural language processing to determine a first answer to the first question. As such, the first question may be answered by the server 110 prior to the server 110 identifying the corpus of documents of the evaluation domain, determining the threshold value for determining sufficiency of domain adaptation, and/or prior to performing domain adaptation of the client domain 130. The server 110 may be further configured to receive a second question for processing according to natural language processing and perform second natural language processing to determine a second answer to the second question. The second question may be received, for example, for processing by the server 110 after the server 110 has determined the threshold value for determining sufficiency of domain adaptation and/or performed domain adaptation of the client domain 130. As a result, the second answer may be based, at least in part, on the dictionary or lexicon 133. As such, the second answer may have a greater degree of accuracy with respect to the second question than a degree of accuracy of the first answer with respect to the first question. For example, the second answer may have the greater degree of accuracy as a result of the server 110 performing the domain adaptation of the client domain 130 until the threshold value for determining sufficiency of domain adaptation has been reached with respect to the domain adaptation of the client domain 130 and the generation of the dictionary or lexicon 133. The natural language processing of the server 110 may be performed according to any suitable method known to one of ordinary skill in the art and a particular method of such is not limited herein.

Figure 2:
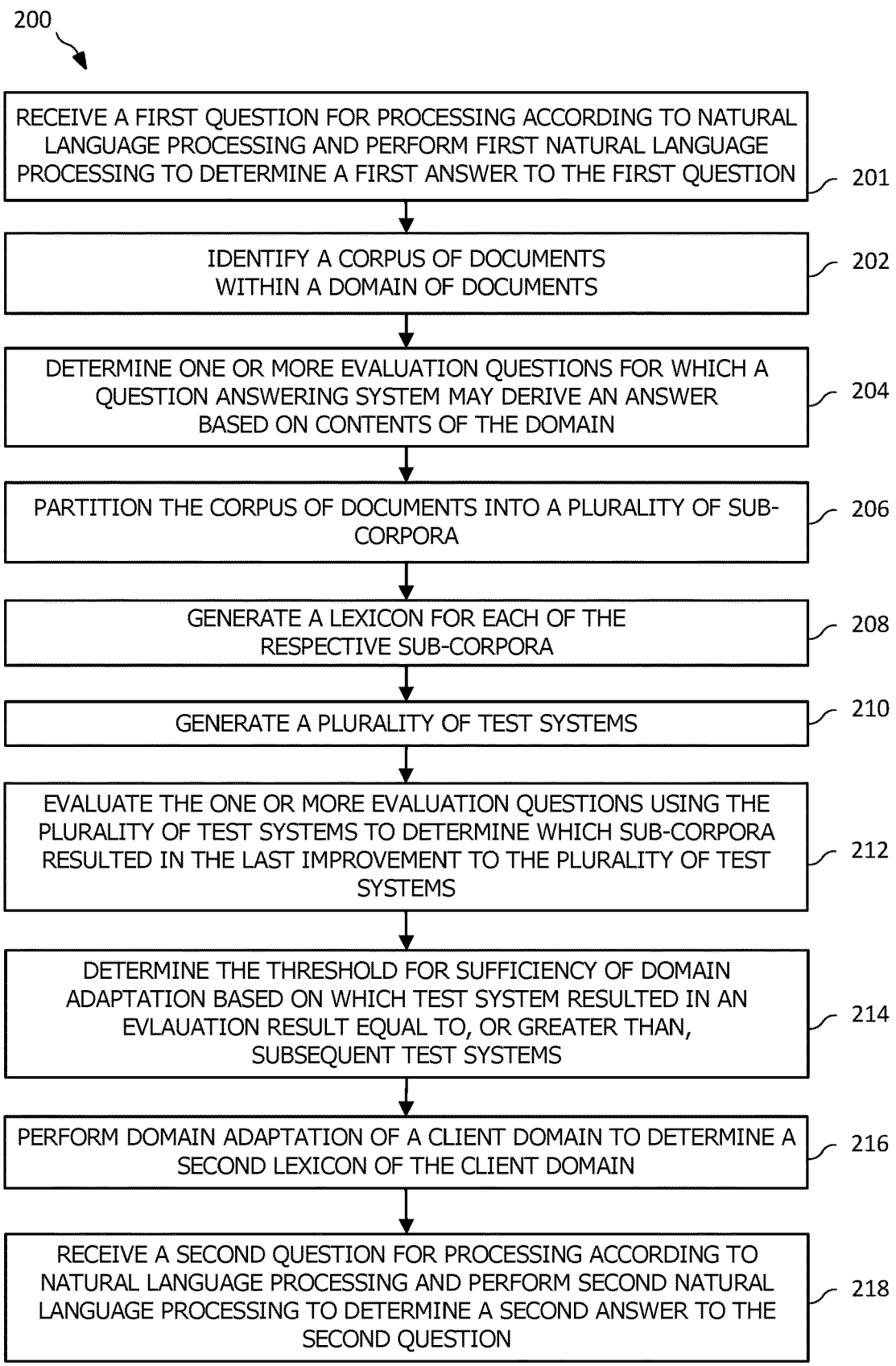
FIG. 2 depicts a flowchart of a method for determining a threshold for sufficiency of domain adaptation according to various embodiments.

With reference now to FIG. 2, a flowchart of a method 200 for determining a threshold for sufficiency of domain adaptation according to various embodiments is shown. The method 200 may be implemented, for example, by a computing device (e.g., the computing device 400, discussed below, implemented as a server 110) when the computing device wishes to determine a threshold that may indicate sufficiency of a lexicon or dictionary generated based on domain adaptation. The method 200 may be, in some embodiments, language specific such that the computing device performs the method 200 separately for each language of documents contained within a domain on which domain adaptation may be performed. In other embodiments, the method 200 may be executed once to determine the threshold for sufficiency of domain adaptation and that threshold may be used in performing domain adaptation for a plurality of domains without performing the method 200 individually for each of the plurality of domains. In some embodiments, based at least in part on a content of the domain, the threshold for sufficiency of domain adaptation may be applicable across all or a plurality of domains for which domain adaptation may be performed and in other embodiments the threshold for sufficiency of domain adaptation may be applicable to a single or a limited number of domains.

At step 202, the computing device may identify a corpus of documents within a domain of documents. In some embodiments, the domain may be an evaluation domain such as may be available in the public domain for the purpose of providing a sample set of data for analysis as will be understood by one of ordinary skill in the art. In other embodiments, the domain may be any domain of documents which may enable determination of the threshold for sufficiency of domain adaptation without respect to a source of the domain or particular contents of the domain. It should be noted that, in some embodiments, the domain may be a dynamically changing domain such that documents contained in the domain may be modified, or documents may be added to, or removed from, the domain, during execution of the method 200 by the computing device.

At step 204, the computing device may develop or determine one or more evaluation questions for which a question answering system (e.g., a deep question answering system) may derive an answer based on contents of the domain. Alternatively, in some embodiments, one or more evaluation questions may be pre-existing questions that may be available in the public domain alongside the domain and may be associated with the domain such that the computing device may utilize the pre-existing questions without developing or generating new questions associated with the domain.

At step 206, the computing device may partition the corpus of documents into a plurality of sub-corpora $C_1$ to $C_N$. The sub-corpora may be formed in any suitable manner such that, for example, the plurality of sub-corpora are approximately equal in size, the plurality of sub-corpora contain approximately an equal number of documents, or each of the sub-corpora contain documents that have a relationship to one another (e.g., a shared subject matter). At step 208, the computing device may generate a lexicon for each of the respective sub-corpora. For example, the computing device may determine each lexicon autonomously, semi-autonomously, or through manual input of a user. The computing device may determine each lexicon, in some embodiments, by extracting n-grams from the respective sub-corpora (e.g., as discussed above with respect to the server 110), key-phrase extraction, and/or any other suitable means for extracting terms from documents of the sub-corpora for inclusion in the lexicon of each respective sub-corpora.

At step 210, the computing device may generate a plurality of test systems, where a number of the plurality of tests systems equals the number of sub-corpora formed by the computing device at step 206. Each of the plurality of test systems may be, for example, a question answering system. The computing device may form the plurality of test systems by forming a unique lexicon for use in question answering by the computing device. A lexicon for each of the test systems may be formed, in some embodiments, by combining one or more lexicons of each respective sub-corpora. For example, a lexicon for a first of the test systems may be the lexicon for a first of the sub-corpora and a lexicon for a second of the test systems may be the lexicon of the first sub-corpora joined with the lexicon of the second sub-corpora. Generally, a lexicon for an Nth test system, may be the lexicon of the first sub-corpora joined consecutively with each lexicon of the other sub-corpora up to, and including, the Nth sub-corpora.

At step 212, the computing device may evaluate the one or more evaluation questions resulting from step 204 using the test systems generated at step 210 to determine which sub-corpora resulted in the last improvement to the plurality of test systems. For example, the computing device may determine an evaluation result for each of the test systems based, at least in part, on an ability of a respective test system to respond to the one or more evaluation questions. The computing device may compare the evaluation result of each test system consecutively, beginning with the first test system, to determine which test system resulted in an evaluation result equal to, or greater than, subsequent test systems. The test system which resulted in an evaluation result equal to, or greater than, subsequent test systems may include all lexicons for which extraction of domain terms included in the lexicons led to an improvement in the ability to answer the evaluation questions and, as such, may indicate a sufficiency of the domain adaptation process that generated the lexicons. For example, for an nth test system of the N test systems which resulted in an evaluation result equal to, or greater than, subsequent test systems, the computing device may determine that generating the lexicons of the first sub-corpora through the nth sub-corpora is sufficient to conclude domain adaptation of the domain (e.g., because the inclusion of additional domain terms from sub-corpora subsequent to the nth sub-corpora may not increase an ability of the computing device to respond to the evaluation questions).

At step 214, the computing device may determine the threshold for sufficiency of domain adaptation based on which test system resulted in an evaluation result equal to, or greater than, subsequent test systems. For example, the threshold may be determined, at least in part, by determining a ratio of domain terms in the nth lexicon which are not present in a lexicon prior to the nth lexicon to a total number of domain terms in the nth lexicon. The threshold may be mathematically expressed, in some embodiments, as:

$$T = \frac{\|L_n \cap \bigcup_i^{n-1} L_i\|}{\|L_n\|},$$

where T is the threshold for sufficiency of domain adaptation, $L_n$ is the nth lexicon, ∩ denotes an intersection operation, ∪ denotes a union operation, and i is an index beginning at 1. For example, the threshold T may be defined as a ratio of the absolute value of a number of elements resulting from an intersection of the nth lexicon with the result of a union of the first through nth minus one lexicon to an absolute value of a number of elements of the nth lexicon.

After determining the threshold, the computing device may proceed to determine a threshold for other languages (e.g., based on the domain for which domain adaptation was performed or for a new evaluation domain), may determine a threshold for domains of other subject matter areas, or may utilize (or transmit for utilization by another computing device) the threshold to determine sufficiency of domain adaptation of a client domain, for example, as discussed below in method 300.

Optionally, the method 200 may further include one or more steps directed to performing question answering. At step 201, the computing device may receive a first question for processing according to natural language processing and perform first natural language processing to determine a first answer to the first question. As such, the first question may be answered by the computing device prior to the computing device identifying the corpus of documents from within the domain and/or determining the threshold for sufficiency of domain adaptation. At step 216, the computing device may, based at least in part on the threshold for sufficiency of domain adaptation, perform domain adaptation of a client domain to determine a lexicon of the domain. The computing device may perform the domain adaptation of the client domain, for example, as described above in FIG. 1 with respect to the server 110. At step 218, the computing device may receive a second question for processing according to natural language processing and perform second natural language processing to determine a second answer to the second question. The second question may be received, for example, for processing by the computing device after the computing device has determined the threshold for sufficiency of domain adaptation and/or performed domain adaptation of the client domain. As a result, the second answer may be based, at least in part, on the lexicon of the client domain determined by the computing device at step 216. As such, the second answer may have a greater degree of accuracy with respect to the second question than a degree of accuracy of the first answer with respect to the first question. For example, the second answer may have the greater degree of accuracy as a result of the computing device performing the domain adaptation of the client domain at step 216 until the threshold value for determining sufficiency of domain adaptation determined at step 214 has been reached. The natural language processing of the computing device may be performed according to any suitable method known to one of ordinary skill in the art and a particular method of such is not limited herein.

Figure 3:
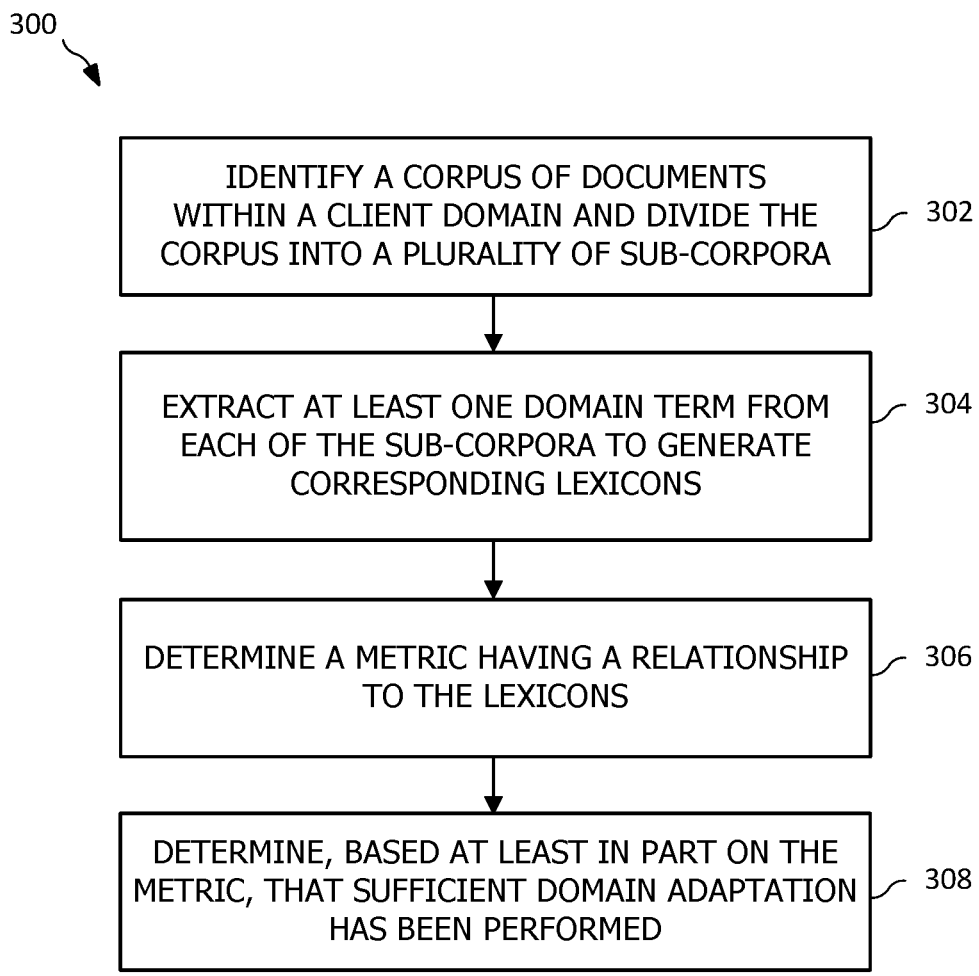
FIG. 3 depicts a flowchart of a method for determining sufficiency of domain adaptation of a client domain according to various embodiments.

With reference now to FIG. 3, a flowchart of a method 300 for determining sufficiency of domain adaptation of a client domain according to various embodiments is shown. The method 300 may be implemented, for example, by a computing device (e.g., the computing device 400, discussed below, implemented as a server 110) when the computing device wishes to perform domain adaptation of a client domain. The domain adaptation may include, for example, lexicon or dictionary creation, sentence syntax (grammar rule) analysis, a taxonomy analysis (e.g., identification of person, places, things, etc.), question and answering system training, and other like activities.

At step 302, the computing device may identify a corpus of documents from within the client domain on which the computing device is performing domain adaptation and divide the corpus into a plurality of sub-corpora. The corpus of documents may be, in some embodiments, a collection of core documents that may contain a large number of terms that may have a relationship to a subject matter of interest to the client. The plurality of sub-corpora may be consecutively ordered such that the corpus is divided into sub-corpora $C_1$ to $C_N$. The sub-corpora may be formed by any suitable means, such as, for example, by data size, quantity of documents, subject matter of documents, etc.

At step 304, the computing device may extract at least one domain term from each of the sub-corpora to generate corresponding lexicons $L_1$ to $L_N$. The computing device may extract the domain terms autonomously, semi-autonomously, or based on input from a user. For example, the computing device may generate the lexicons according to automatically generated n-gram frequency lists that optionally may then be manually reviewed by a user for intelligibility and/or suitability. Alternatively, the computing device may extract the domain terms according to key-phrase extraction to generate the lexicons. In some embodiments, the computing device may extract the domain terms from the sub-corpora for inclusion in the lexicons corresponding to each respective sub-corpora according to any suitable means.

At step 306, the computing device may calculate or determine a metric having a relationship to the lexicons $L_1$ to $L_N$ to determine whether the computing device has performed sufficient domain adaptation such that domain adaptation may end. For example, the computing device may determine a ratio of newly extracted unique domain terms to a number of domain terms extracted overall (e.g., a "type-token" ratio that may begin at one for the first domain term extracted and approaches zero as a proportion of newly extracted domain terms approaches zero). The metric may be mathematically expressed, where $1 \leq n \leq N$, in some embodiments, as:

$$R_n = \frac{\|L_n \cap \bigcup_i^{n-1} L_i\|}{\|L_n\|},$$

where $R_n$ is the metric for one sub-corpora for determining whether the computing device has performed sufficient domain adaptation, $L_n$ is the nth lexicon, $\cap$ denotes an intersection operation, $\cup$ denotes a union operation, and i is an index beginning at 1. For example, the metric $R_n$ may be defined as a ratio of the absolute value of a number of elements resulting from an intersection of the nth lexicon with the result of a union of the first through nth minus one lexicon to an absolute value of a number of elements of the nth lexicon.

At step 308, the computing device may determine, based at least in part on the metric $R_n$ and a predetermined threshold T (e.g., the threshold T determined as above in method 200), whether the computing device has performed sufficient domain adaptation of the client domain (e.g., such that the computing device may end domain adaptation of the client domain). For example, in one embodiment, when $R_n < T$, the computing device may determine that domain adaptation is complete and may end domain adaptation of the client domain. In other embodiments, when $R_n > T$, the computing device may determine that it may be desirable to expand the corpus of the domain that is being utilized for domain adaptation (e.g., the corpus identified at step 302). Optionally, the method 300 may further include performing natural language processing to answer one or more questions, for example, as described above with respect to the server 110 and the computing device of the method 200, details of which are not repeated again herein.

Figure 4:
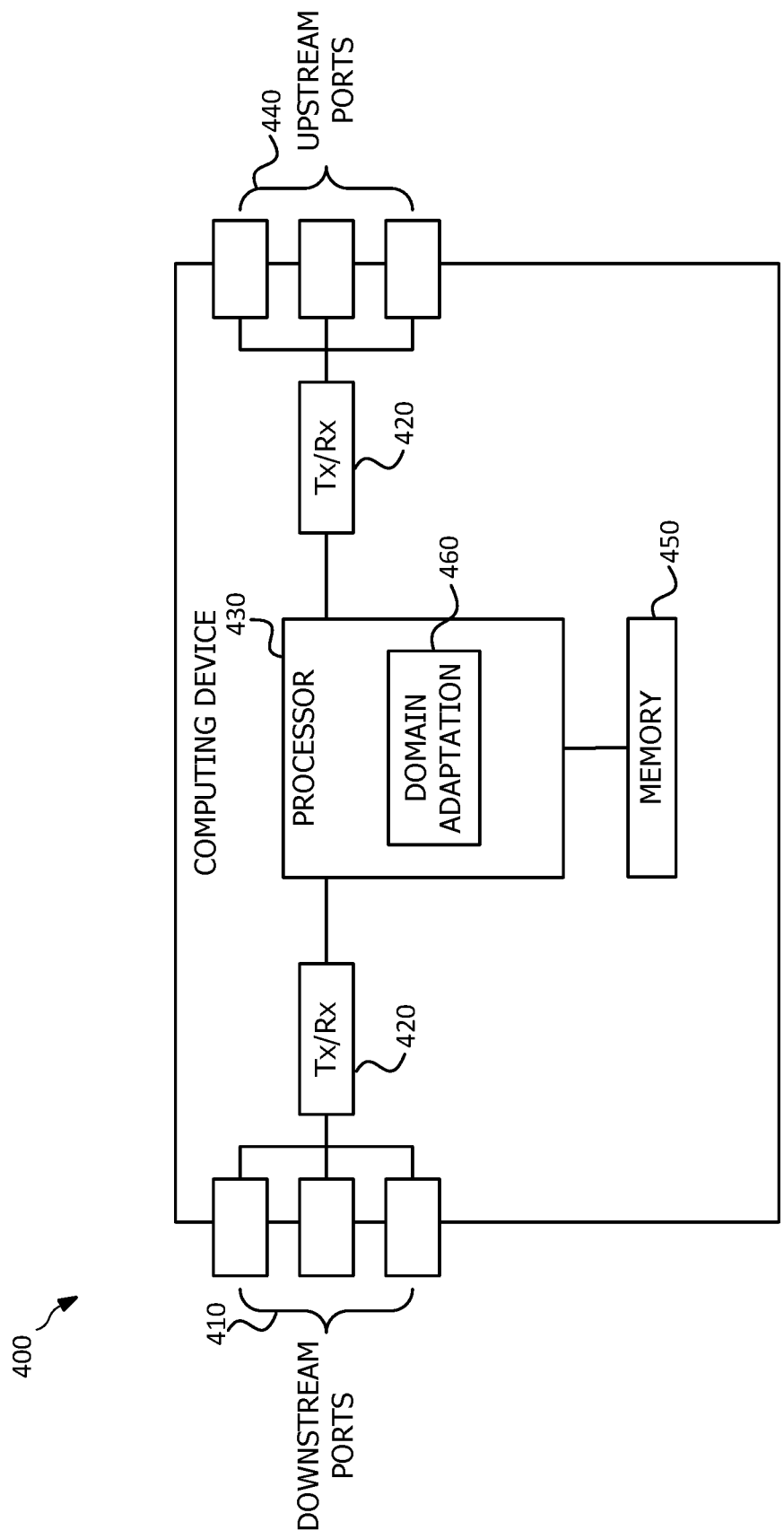
FIG. 4 depicts a computing device according to various embodiments.

With reference now to FIG. 4, a schematic diagram of a computing device 400 according to various embodiments is shown. Computing device 400 may be any suitable processing device capable of performing the functions disclosed herein such as a computer system, a server, a cloud computing node (e.g., as discussed above with respect to FIG. 1, FIG. 2, and/or FIG. 3), or may be generally representative of a distributed computing device in which one or more components of computing device 400 are distributed or shared across one or more devices. Computing device 400 is configured to implement at least some of the features/methods disclosed herein, for example, the domain adaptation of system 100 and/or methods 200 and/or 300, discussed above. In various embodiments, for instance, the features/methods of this disclosure are implemented using hardware, firmware, and/or software installed to run on hardware.

Computing device 400 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the computing device 400 is an apparatus and/or system configured to implement the domain adaptation of system 100 and/or methods 200 and/or 300, for example according to a computer program product.

The computing device 400 comprises one or more downstream ports 410 coupled to a transceiver (Tx/Rx) 420, which are transmitters, receivers, or combinations thereof. The Tx/Rx 420 transmits and/or receives frames from other computing devices via the downstream ports 410. Similarly, the computing device 400 comprises another Tx/Rx 420 coupled to a plurality of upstream ports 440, wherein the Tx/Rx 420 transmits and/or receives frames from other nodes via the upstream ports 440. The downstream ports 410 and/or the upstream ports 440 may include electrical and/or optical transmitting and/or receiving components. In another embodiment, the computing device 400 comprises one or more antennas (not shown) coupled to the Tx/Rx 420. The Tx/Rx 420 transmits and/or receives data (e.g., packets) from other computing or storage devices wirelessly via the one or more antennas.

A processor 430 is coupled to the Tx/Rx 420 and is configured to determine sufficiency of domain adaptation of a client domain, for example, by determining a threshold for sufficiency of domain adaptation. In an embodiment, the processor 430 comprises one or more multi-core processors and/or memory modules 450, which functions as data stores, buffers, etc. The processor 430 is implemented as a general processor or as part of one or more application specific integrated circuits (ASICs), field-programmable gate arrays (FPGAs), and/or digital signal processors (DSPs). Although illustrated as a single processor, the processor 430 is not so limited and alternatively comprises multiple processors. The processor 430 further comprises processing logic configured to execute a domain adaptation computer program product 460 that is configured to determine a threshold for sufficiency of domain adaptation and determine whether performed domain adaptation is sufficient based, at least in part, on the threshold.

FIG. 4 also illustrates that a memory module 450 is coupled to the processor 430 and is a non-transitory medium configured to store various types of data. Memory module 450 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 450 may be used to house the instructions for carrying out the various embodiments described herein. For example, the memory module 450 may comprise the domain adaptation computer program product 460, which is executed by processor 430.

It is understood that by programming and/or loading executable instructions onto the computing device 400, at least one of the processor 430 and/or the memory module 450 are changed, transforming the computing device 400 in part into a particular machine or apparatus, for example, a domain adaptation device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
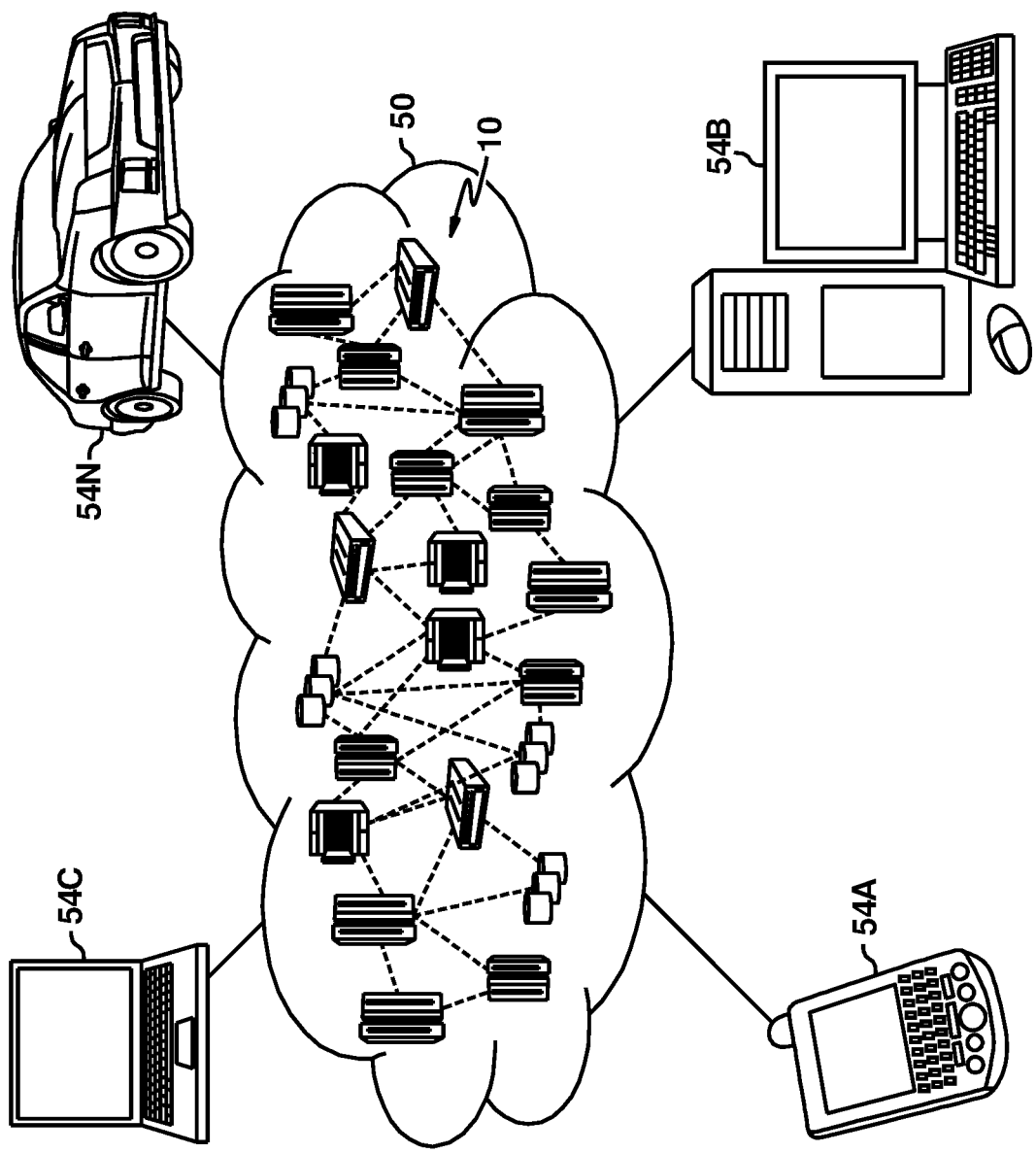
FIG. 5 depicts a cloud computing environment according to various embodiments.
Figure 6:
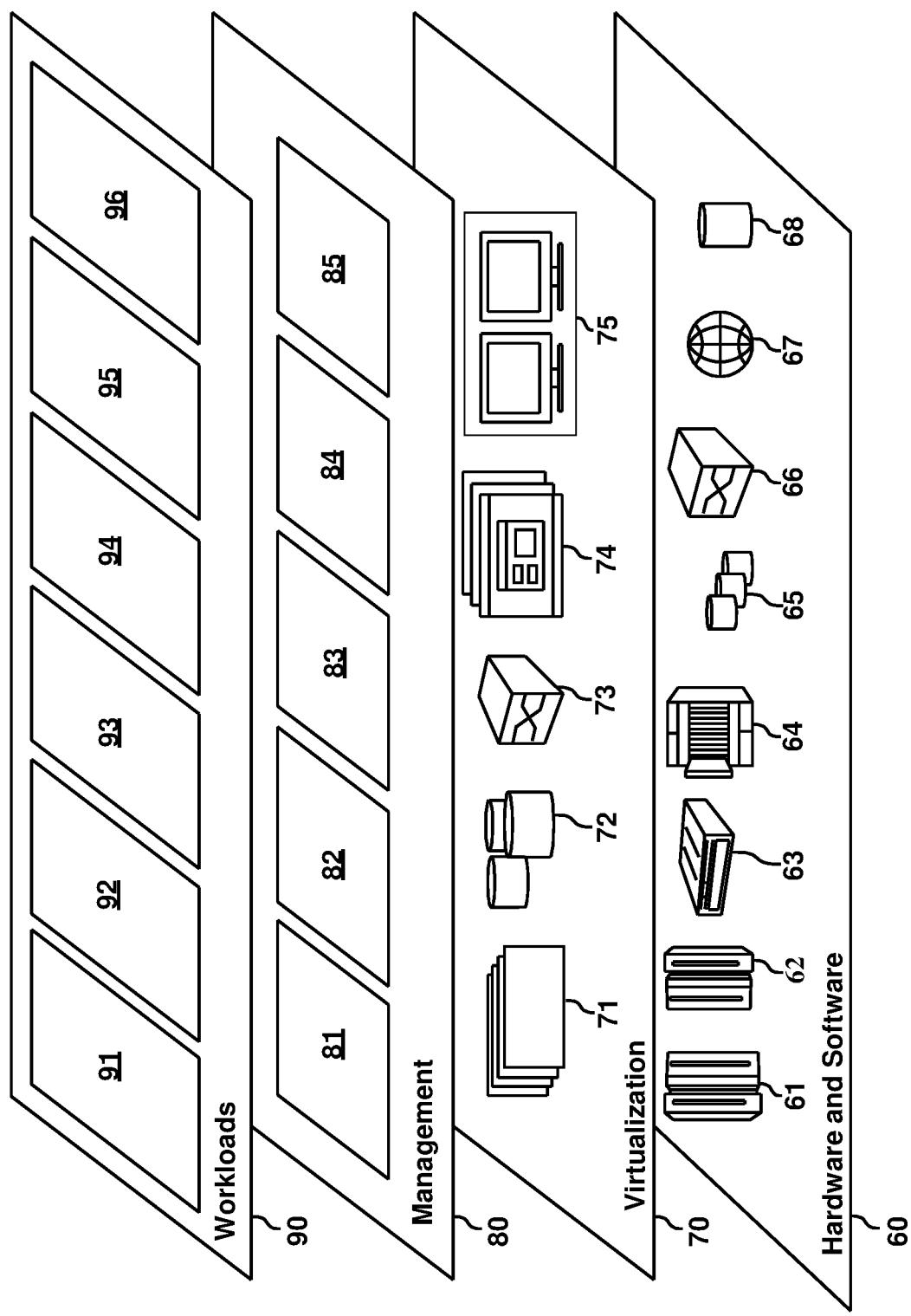
FIG. 6 depicts abstraction model layers according to various embodiments.

Turning now to FIGS. 5 and 6, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the domain adaptation described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and domain adaptation 96. These workloads and functions of workloads layer 90 may be end-user applications that enable a subscriber to cloud computing infrastructure 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing infrastructure 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by a processor, a corpus of documents from within a domain;
   determining, by the processor, an evaluation question for use with a question answering system to determine an answer to the evaluation question based on content of the domain;
   partitioning the corpus of documents into a plurality of sub-corpora;
   generating a lexicon for each of the respective sub-corpora;
   generating a plurality of test systems each corresponding uniquely to one of the plurality of sub-corpora;
   evaluating the evaluation question using the plurality of test systems to determine a plurality of evaluation results each corresponding uniquely to one of the plurality of test systems; and
   determining a threshold for sufficiency of domain adaptation based on at least one of the evaluation results.

2. The computer-implemented method of claim 1, wherein generating the plurality of test systems each corresponding uniquely to one of the plurality of sub-corpora comprises combining one or more lexicons of each of the respective sub-corpora to generate the plurality of test systems.

3. The computer-implemented method of claim 1, wherein evaluating the evaluation question using the test systems to determine the plurality of evaluation results each corresponding uniquely to one of the plurality of test systems comprises determining that a first evaluation result of the plurality of evaluation results corresponding to a first test system of the plurality of test systems is greater than or equal to a second evaluation result of the plurality of evaluation results that corresponds to a second test system of the plurality of test systems.

4. The computer-implemented method of claim 3, wherein determining the threshold for sufficiency of domain adaptation based on at least one of the evaluation results comprises determining a ratio of domain terms associated with the first evaluation result and the first test system which are not associated with a third evaluation result of a third test system that is prior to the first test system to a total number of the domain terms associated with the first evaluation result and the first test system.

5. The computer-implemented method of claim 4, wherein the threshold for sufficiency of domain adaptation is determined according to $$T = \frac{\|L_n \cap \bigcup_i^{n-1} L_i\|}{\|L_n\|},$$

wherein T is the threshold for sufficiency of domain adaptation, wherein $L_n$ is a lexicon containing the domain terms associated with the first evaluation result and the first test system, wherein $\cap$ denotes an intersection operation, wherein $\cup$ denotes a union operation, and wherein i is an index beginning at 1.

6. The computer-implemented method of claim 5, wherein the lexicon containing the domain terms associated with the first evaluation result and the first test system contains domain terms associated with one or more tests systems prior to the first test system in the plurality of test systems.

7. The computer-implemented method of claim 1, wherein before identifying, by the processor, the corpus of documents from within the domain, the method further comprises:
   receiving a first question for processing, by the processor, according to natural language processing; and
   performing, by the processor, first natural language processing to determine a first answer to the first question, wherein after determining the threshold for sufficiency of domain adaptation based on the at least one of the evaluation results, the method further comprises:
   performing, by the processor, domain adaptation of a client domain to determine a second lexicon of the client domain;
   receiving, by the processor, a second question for processing according to natural language processing; and
   performing, by the processor, second natural language processing to determine a second answer to the second question based at least in part on the second lexicon, and wherein the second answer has a greater degree of accuracy with respect to the second question than a degree of accuracy of the first answer with respect to the first question.

8. An apparatus comprising:
   a memory comprising computer-readable instructions; and
   a processor coupled to the memory and configured to execute the instructions, which causes the processor to be configured to:
   identify a corpus of documents from within a domain;

determine an evaluation question for use with a question answering system to determine an answer to the evaluation question based on content of the domain;
partition the corpus of documents into a plurality of sub-corpora;
generate a lexicon for each of the respective sub-corpora;
generate a plurality of test systems each corresponding uniquely to one of the plurality of sub-corpora;
evaluate the evaluation question using the plurality of test systems to determine a plurality of evaluation results each corresponding uniquely to one of the plurality of test systems; and
determine a threshold for sufficiency of domain adaptation based on at least one of the evaluation results.

9. The apparatus of claim 8, wherein generating the plurality of test systems each corresponding uniquely to one of the plurality of sub-corpora comprises combining one or more lexicons of each of the respective sub-corpora to generate the plurality of test systems.

10. The apparatus of claim 8, wherein evaluating the evaluation question using the test systems to determine the plurality of evaluation results each corresponding uniquely to one of the plurality of test systems comprises determining that a first evaluation result of the plurality of evaluation results corresponding to a first test system of the plurality of test systems is greater than or equal to a second evaluation result of the plurality of evaluation results that corresponds to a second test system of the plurality of test systems.

11. The apparatus of claim 10, wherein determining the threshold for sufficiency of domain adaptation based on at least one of the evaluation results comprises determining a ratio of domain terms associated with the first evaluation result and the first test system which are not associated with a third evaluation result of a third test system that is prior to the first test system to a total number of the domain terms associated with the first evaluation result and the first test system.

12. The apparatus of claim 11, wherein the threshold for sufficiency of domain adaptation is determined according to $$T = \frac{\|L_n \cap \bigcup_{i}^{n-1} L_i\|}{\|L_n\|},$$

wherein T is the threshold for sufficiency of domain adaptation, wherein $L_n$ is a lexicon containing the domain terms associated with the first evaluation result and the first test system, wherein $\cap$ denotes an intersection operation, wherein $\cup$ denotes a union operation, and wherein i is an index beginning at 1.

13. The apparatus of claim 12, wherein the lexicon containing the domain terms associated with the first evaluation result and the first test system contains domain terms associated with one or more tests systems prior to the first test system in the plurality of test systems.

14. The apparatus of claim 8, wherein before identifying, by the processor, the corpus of documents from within the domain, the processor is further configured to:
receive a first question for processing according to natural language processing; and
perform first natural language processing to determine a first answer to the first question, wherein after determining the threshold for sufficiency of domain adaptation based on the at least one of the evaluation results, the method further comprises:

perform domain adaptation of a client domain to determine a second lexicon of the client domain;
receive a second question for processing according to natural language processing; and
perform second natural language processing to determine a second answer to the second question based at least in part on the second lexicon, and wherein the second answer has a greater degree of accuracy with respect to the second question than a degree of accuracy of the first answer with respect to the first question.

15. A computer program product for performing domain adaptation of a domain, the computer program product comprising a computer readable storage medium having program instructions embodied therewith, the program instructions executable by a processor to cause the processor to:
identify a corpus of documents from within a domain;
determine an evaluation question for use with a question answering system to determine an answer to the evaluation question based on content of the domain;
partition the corpus of documents into a plurality of sub-corpora;
generate a lexicon for each of the respective sub-corpora;
generate a plurality of test systems each corresponding uniquely to one of the plurality of sub-corpora;
evaluate the evaluation question using the plurality of test systems to determine a plurality of evaluation results each corresponding uniquely to one of the plurality of test systems; and
determine a threshold for sufficiency of domain adaptation based on at least one of the evaluation results.

16. The computer program product of claim 15, wherein generating the plurality of test systems each corresponding uniquely to one of the plurality of sub-corpora comprises combining one or more lexicons of each of the respective sub-corpora to generate the plurality of test systems.

17. The computer program product of claim 15, wherein evaluating the evaluation question using the test systems to determine the plurality of evaluation results each corresponding uniquely to one of the plurality of test systems comprises determining that a first evaluation result of the plurality of evaluation results corresponding to a first test system of the plurality of test systems is greater than or equal to a second evaluation result of the plurality of evaluation results that corresponds to a second test system of the plurality of test systems.

18. The computer program product of claim 15, wherein determining the threshold for sufficiency of domain adaptation based on at least one of the evaluation results comprises determining a ratio of domain terms associated with the first evaluation result and the first test system which are not associated with a third evaluation result of a third test system that is prior to the first test system to a total number of the domain terms associated with the first evaluation result and the first test system.

19. The computer program product of claim 18, wherein the threshold for sufficiency of domain adaptation is determined according to $$T = \frac{\|L_n \cap \bigcup_{i}^{n-1} L_i\|}{\|L_n\|},$$

wherein T is the threshold for sufficiency of domain adaptation, wherein $L_n$ is a lexicon containing the domain terms associated with the first evaluation result and the first test system, wherein ∩ denotes an intersection operation, wherein ∪ denotes a union operation, and wherein i is an index beginning at 1.

20. The computer program product of claim 15, wherein the instructions executable by the processor further cause the processor to, before identifying the corpus of documents from within the domain:
- receive a first question for processing according to natural language processing; and
- perform first natural language processing to determine a first answer to the first question, wherein after determining the threshold for sufficiency of domain adaptation based on the at least one of the evaluation results, the method further comprises:
- perform domain adaptation of a client domain to determine a second lexicon of the client domain;
- receive a second question for processing according to natural language processing; and
- perform second natural language processing to determine a second answer to the second question based at least in part on the second lexicon, and wherein the second answer has a greater degree of accuracy with respect to the second question than a degree of accuracy of the first answer with respect to the first question.

* * * * *